July 21, 1959 V. F. FISHTAHLER 2,895,315
VIBRATION DAMPING MEANS
Filed Dec. 17, 1956
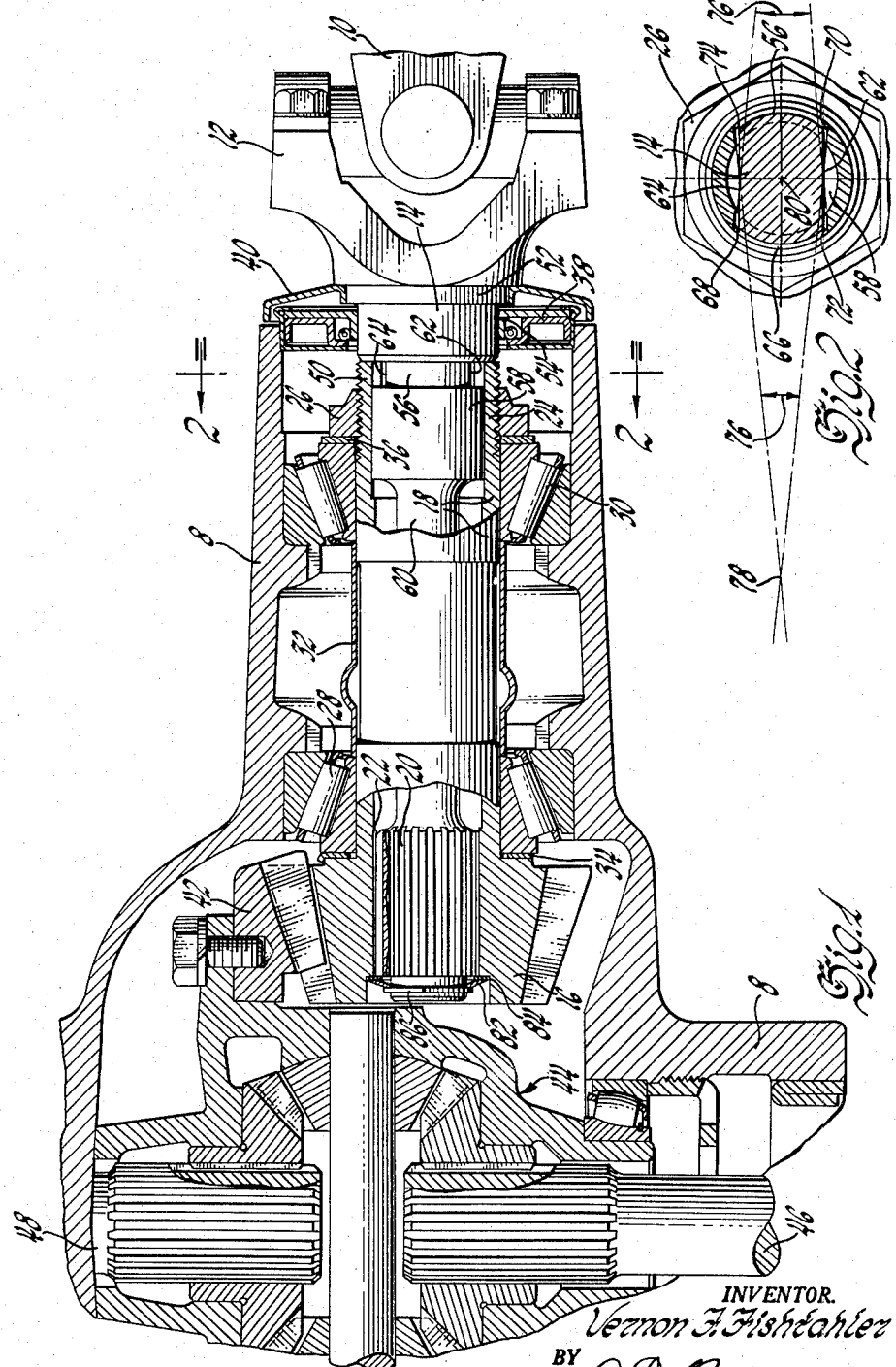
INVENTOR.
Vernon F. Fishtahler
BY
ATTORNEY.

United States Patent Office 2,895,315
Patented July 21, 1959

2,895,315

VIBRATION DAMPING MEANS

Vernon F. Fishtahler, Lathrup Village, Mich., assignor to General Motors Corporation, Detroit, Mich., a corporation of Delaware Application December 17, 1956, Serial No. 628,915

3 Claims. (Cl. 64—27)

The invention relates to a vibration damping means in a power drive shaft and more particularly to dampers in drive shaft and differential assemblies for automotive vehicles.

In the automotive field there has long been an industrywide problem of silencing drive shaft and differential noises. These noises are particularly objectionable since they are easily telegraphed through the drive shaft and supporting portions of the chassis and emerge at remote points, giving the impression that the noises originate in locations other than the differential mechanism.

It is now proposed to provide a torsional vibration damper immediately adjacent the differential gear mechanism which has a low torsional vibration rate as compared to the drive shaft connecting the engine and transmisison with the differential. This damper will tune out the vibrations set up in the differential and prevent their introduction to other parts of the vehicle.

In the drawing:

Figure 1 is a view of a differential and drive shaft assembly embodying the invention and having parts broken away and in section.

Figure 2 is a sectional view taken in the direction of arrows 2—2 of Figure 1.

The drive shaft and differential mechanism shown in Figure 1 is enclosed in a casing 8. The driving element 10 of a universal joint 12 receives power from the engine and transmission and transmits that power to pinion drive shaft 14. Shaft 14 is rotationally connected with the differential gear drive pinion 16. A drive pinion quill shaft 18 is integrally formed with or secured to pinion 16 and extends from that pinion in a direction toward universal joint 12. Quill shaft 18 terminates within casing 8 near the point of entry of shaft 14 into the casing and concentrically surrounds drive shaft 14. The rear end of drive shaft 14 terminates within drive pinion 16 and is drivingly connected thereto by external splines 20 formed on an enlarged portion of shaft 14 and complementary internal splines 22 formed within pinion 16. The forward end 24 of quill shaft 18 has external threads formed thereon and nut 26 is screwed on the end of the shaft. Thrust bearings 28 and 30 support quill shaft 18 in casing 8. A generally cylindrical spacer 32 is positioned intermediate thrust bearings 28 and 30 and engages the bearing inner races. One or more shims 34 are positioned between drive pinion 16 and the inner race of bearing 28, and washer 36 is positioned between nut 26 and the inner race of bearing 30. Nut 26 acts through washer 36, the inner race of bearing 30, spacer 32, the inner race of bearing 28 and shim 34 to maintain the proper spacing between the thrust bearings and the drive pinion. Casing 8 may be provided with an oil seal 38 in engagement with drive shaft 14 and a dust cover 40 may be secured to the drive shaft adjacent the oil seal to provide additional protection for the casing interior and retain lubricant therein. The drive pinion 16 meshes with beveled carrier drive gear 42 of differential 44. Drive torque is transmitted from the differential to the vehicle wheels through axles 46 and 48.

The forward end of quill shaft 18 is provided with a bypass drive connection 50 which may partially bypass a portion of pinion shaft 14. The bypass drive connection is shown in detail in Figure 2.

Shaft 14 may be formed with a dust cover mounting section 52, an oil seal section 54, a bypass drive section 56, an enlarged pilot section 58 and a relatively small diameter, low torsional rate section 60 which terminates at the large section having external splines 20 formed thereon.

As is shown in Figure 2, the bypass drive section 56 of shaft 14 has a pair of parallel flat surfaces 62 and 64 formed along oppositely disposed chords as viewed in cross-section. The forward end 24 of quill shaft 18 has a slot 66 formed therein with surfaces 68, 70, 72 and 74 in complementary relation to said surfaces 62 and 64 on shaft 14. Surfaces 68 and 70 are parallel and surfaces 72 and 74 are parallel. Slot 66 is slightly larger than the thickness of bypass drive section 56 between flat surfaces 62 and 64. Surfaces 68 and 72 are preferably non-parallel as are surfaces 70 and 74, but form an acute angle 76 therebetween with the apex 78 of the angle formed thereby on the opposite side of the shaft axis 80 from the respective non-parallel surfaces.

In operation, the drive torque is transmitted through universal joint 12 and shaft 14 and a torque is impressed upon the low torsional rate section 60. The diameter of this section is so dimensioned as the provide for a low torsional rate in comparison with the torsional rate of the drive shaft between the transmission and universal joint 12. The low torsional rate will tend to tune out objectionable vibrations. When sufficient torque is impressed upon shaft 14, its forward end adjacent bypass drive section 56 is angularly displaced relative to its rear end on which splines 20 are formed. Since quill shaft 18 is attached to the rear end of drive shaft 14, the forward end of the drive shaft is also angularly displaced relative to the quill shaft. When a predetermined angular displacement is attained, the surfaces 62 and 64 on the shaft 14 engage the complementary surfaces 68 and 70, or 72 and 74, depending upon the direction of rotation, and a portion of the drive torque is transmitted from the bypass drive section 56 through the quill shaft 18 to drive pinion 16.

Quill shaft 18 may be maintained in a forward position relative to the drive shaft 14 by Belleville spring 82, washer 84 and snap ring 86.

The low torsional rate section 60 of the drive shaft will absorb and tune out most of the vibrations set up between the drive pinion 16 and the drive gear 42 and will prevent their transmission through the drive shaft to other parts of the automobile. The bypass drive provides maximum angular displacement limits beyond which section 60 cannot be torsionally stressed.

What is claimed is:

1. In a differential drive mechanism, a casing having differential gears and a differential gear drive pinion and a drive shaft mounted therein, said pinion having a quill shaft extending toward said drive shaft and rotatably mounted in a plurality of thrust bearings, spacing means disposed radially outward of said quill shaft for maintaining a desired spacing between said pinion and said bearings, first means interconnecting said pinion and said drive shaft and disposed concentrically within said quill shaft and said spacing means, and second means adapted to interconnect said quill shaft and said drive shaft upon a predetermined angular displacement of said first means.

2. In combination in a power transmission assembly, torsional power transmitting mechanism and thrust resisting mechanism for taking thrust loads on said assembly, said power transmitting mechanism including a first shaft interconnecting drive and driven elements and having a lower torsional rate than either of said elements and adapting to be angularly displaced under torsional loads, means for bypassing a portion of said torsional loads when a predetermined angularly displacement is obtained, said bypassing means including a shaft concentrically surrounding said first named shaft and adapted to interconnect said drive and driven elements in parallel with said first named shaft, said thrust resisting mechanism including spaced thrust bearings on said second named shaft, thrust spacer means intermediate said bearings and a threaded nut on said second named shaft operatively engaging one of said bearings for holding said bearings and said spacer means in properly spaced relation on said second named shaft for receiving thrust loads therefrom.

3. Torsional and thrust power mechanism including a first resilient shaft for transmitting torsional forces to a rotatable member, a quill shaft on said rotatable member for transmitting torsional forces concurrently with said first shaft when a predetermined torsional load on said first shaft is exceeded, and thrust transmitting means concentrically outward of said shaft for receiving thrust forces from said rotatable member, said thrust transmitting means comprising a plurality of elements including a pair of thrust bearings, an annular spacer therebetween, a nut threaded on said quill shaft, and shim means intermediate said rotatable member and an element of said thrust transmitting means.

References Cited in the file of this patent

UNITED STATES PATENTS

| | | |
|---|---|---|
| 993,570 | Webster | May 30, 1911 |
| 1,965,742 | Junkers | July 10, 1934 |
| 2,220,751 | Bergman | Nov. 5, 1940 |
| 2,734,359 | Mulheim et al. | Feb. 14, 1956 |
| 2,776,556 | Gustafson et al. | Jan. 8, 1957 |

FOREIGN PATENTS

| | | |
|---|---|---|
| 302,625 | Great Britain | Dec. 17, 1928 |